(12) United States Patent  (10) Patent No.: US 8,955,301 B2
Segura  (45) Date of Patent: Feb. 17, 2015

(54) D-RING APPARATUS

(76) Inventor: Jarrod Segura, New Iberia, LA (US)

( * ) Notice: Subject to any disclaimer, the term of this patent is extended or adjusted under 35 U.S.C. 154(b) by 0 days.

(21) Appl. No.: 13/488,545

(22) Filed: Jun. 5, 2012

(65) Prior Publication Data

US 2013/0318749 A1  Dec. 5, 2013

(51) Int. Cl.
*F16G 15/12* (2006.01)

(52) U.S. Cl.
USPC ............................................. 59/90; 59/93

(58) Field of Classification Search
CPC ............................................... F16B 11/12
USPC ......... 24/116 R, 129 R, 129 B; 59/84, 85, 90, 59/93
See application file for complete search history.

(56) References Cited

U.S. PATENT DOCUMENTS

| | | | |
|---|---|---|---|
| 1,219,873 A | | 3/1917 | Sapo |
| 2,092,239 A | * | 9/1937 | Bergloff .................... 24/129 R |
| 2,895,290 A | * | 7/1959 | Devonshire et al. ............. 59/90 |
| D187,812 S | * | 5/1960 | Randall .......................... D11/93 |
| 3,594,048 A | * | 7/1971 | Korner et al. .................. 305/204 |
| 3,678,543 A | | 7/1972 | Hobbs |
| 3,857,139 A | | 12/1974 | Turner |
| 4,094,141 A | * | 6/1978 | Rehbein ........................... 59/93 |
| 4,409,874 A | * | 10/1983 | Nitschmann et al. ........... 83/833 |
| 5,293,672 A | | 3/1994 | Tominaga et al. |
| 5,388,433 A | | 2/1995 | Andersson et al. |
| 5,402,877 A | * | 4/1995 | Thiele et al. ................... 198/731 |
| D371,508 S | | 7/1996 | Sagol |
| 6,298,525 B1 | | 10/2001 | Margo |
| 6,425,543 B1 | | 7/2002 | King |
| 6,435,565 B2 | | 8/2002 | Potts et al. |
| 6,800,070 B2 | | 10/2004 | Mazidji et al. |
| 6,848,287 B1 | | 2/2005 | Huang |
| 7,181,807 B2 | | 2/2007 | Oatway |
| 7,234,995 B2 | | 6/2007 | Fildan et al. |
| 7,363,840 B1 | | 4/2008 | Farley |
| 7,551,077 B2 | | 6/2009 | Raybuck et al. |
| 7,784,508 B2 | | 8/2010 | Kemp et al. |
| 7,805,816 B1 | * | 10/2010 | Thorne et al. .................... 24/301 |
| 7,877,916 B2 | | 2/2011 | Chamandy |
| 7,882,600 B2 | | 2/2011 | Judd |
| 7,887,271 B2 | | 2/2011 | Perkin et al. |
| 7,946,002 B2 | | 5/2011 | Uehara |
| 2004/0092874 A1 | | 5/2004 | Mazidji et al. |
| 2005/0067222 A1 | * | 3/2005 | Casebolt et al. ................ 182/30 |
| 2007/0016900 A1 | | 1/2007 | Brandt et al. |
| 2007/0061186 A1 | | 3/2007 | Boraas et al. |
| 2007/0145129 A1 | | 6/2007 | Perkin et al. |
| 2008/0238667 A1 | | 10/2008 | Olson |
| 2009/0223200 A1 | * | 9/2009 | Kinert et al. ....................... 59/84 |

FOREIGN PATENT DOCUMENTS

EP  1134096 B1  5/2006
WO  WO0124653  4/2001

* cited by examiner

*Primary Examiner* — Jack W Lavinder
(74) *Attorney, Agent, or Firm* — Russel O. Primeaux; Pamela A. Baxter; Kean Miller LLP (57) ABSTRACT

An improved D-ring apparatus is provided that comprises a first arm and a second arm, a first arcuate member and a second arcuate member, and a connecting member. The first arm and second arm are substantially parallel to each other. The first arcuate member and the second arcuate member are attached to the first and second arms so that the first and second members are located at opposite ends of the first and second arms and form a continuous apparatus. A connecting member is attached to the first and second arm approximately mid-way between the first and second arcuate members, thereby forming a first aperture and a second aperture.

15 Claims, 7 Drawing Sheets

D-RING APPARATUS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

The drawings constitute a part of this specification and include exemplary embodiments of the improved D-ring apparatus, which may be embodied in various forms. It is to be understood that in some instances, various aspects of the invention may be shown exaggerated or enlarged to facilitate an understanding of the invention. Therefore the drawings may not be to scale.

DETAILED DESCRIPTION

Figure 1:
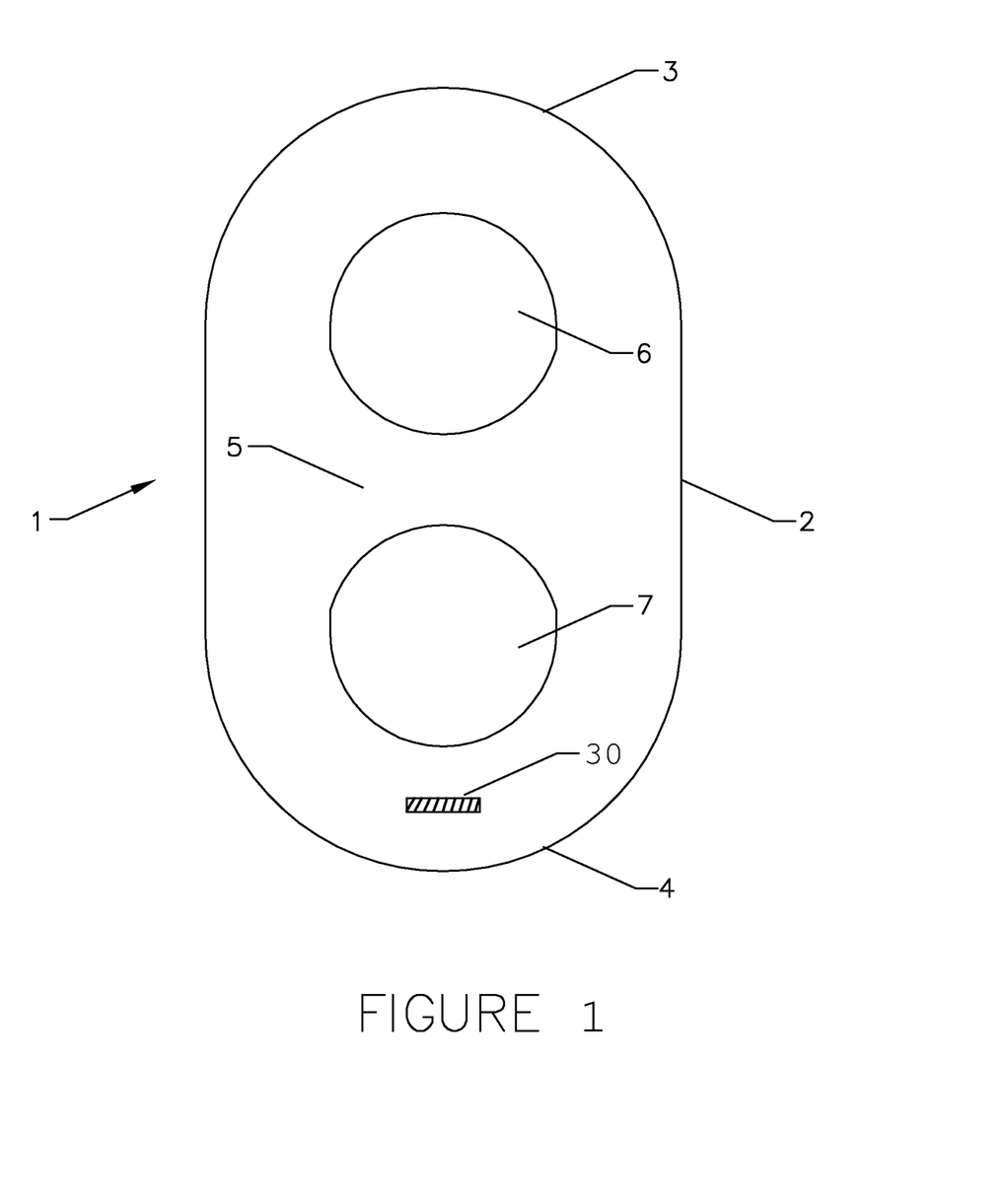
FIG. 1 is a front view of an improved D-ring apparatus with a wear indicator.
Figure 2:
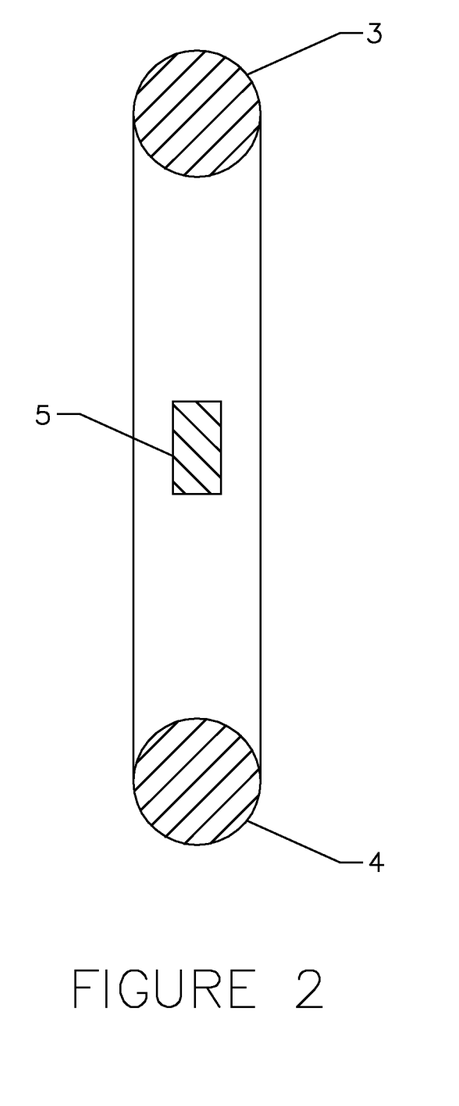
FIG. 2 is a side view of an improved D-ring apparatus.
Figure 3:
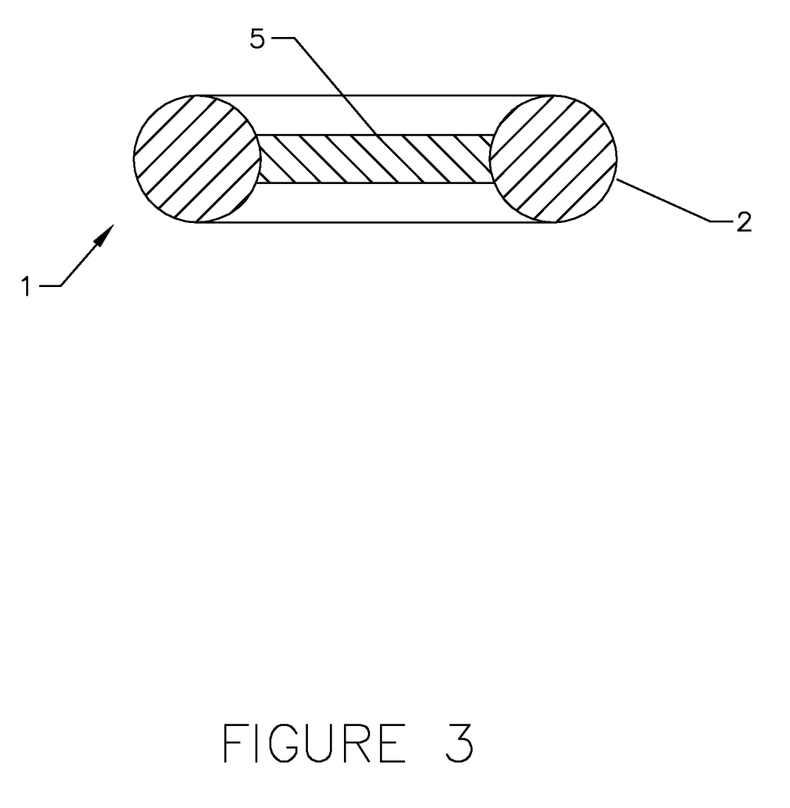
FIG. 3 is an end view of an improved D-ring apparatus.

As shown in FIG. 1, an improved D-ring apparatus comprises a first arm 1, a second arm 2, a first arcuate member 3, a second arcuate member 4, and a connecting member 5. The first arm 1 and second arm 2 are substantially parallel. First arm 1 has a first side and second side. Second arm 2 has a first side and second side. Both first arm 1 and second arm 2 are attached to the first arcuate member 3 on the first side of first arm 1 and first side of second arm 2. First arm 1 and second arm 2 are attached to the second arcuate member 4 on the second side of first arm 1 and the second side of second arm 2. First arm 1 and second arm 2 are attached to both the first arcuate member 3 and the second arcuate member 4 such that first arcuate member 3 and second arcuate member 4 are located on opposite sides of first arm 1 and second arm 2 and a continuous structure is formed. The size of the improved D-ring apparatus varies based on the use and can be determined by reference to the appropriate industry standards for the use to which the improved D-ring apparatus will be subjected, including but not limited to, industry standards for lifting.

First arm 1, second arm 2, first arcuate member 3, and second arcuate member 4 are substantially the same thickness. First arm 1, second arm 2, first arcuate member 3, and second arcuate member 4 have a curved front and back side. First arm 1, second arm 2, first arcuate member 3, and second arcuate member 4 define an aperture. In one embodiment, the interior edges of first arm 1, second arm 2, first arcuate member 3, and second arcuate members 4 which are located on the interior of the D-ring apparatus comprise a substantially flat surface instead of being rounded. In another embodiment, the interior edges of first arm 1, second arm 2, first arcuate member 3, and second arcuate member 4 are rounded. In yet another embodiment, the exterior edges of first arm 1, second arm 2, first arcuate member 3, and second arcuate member 4 also comprise a substantially flat surface, in that they are not rounded as the front and back side of the arms and arcuate members. In another embodiment the exterior edges of first arm 1, second arm 2, first arcuate member 3, and second arcuate member 4 are rounded.

Figure 7:
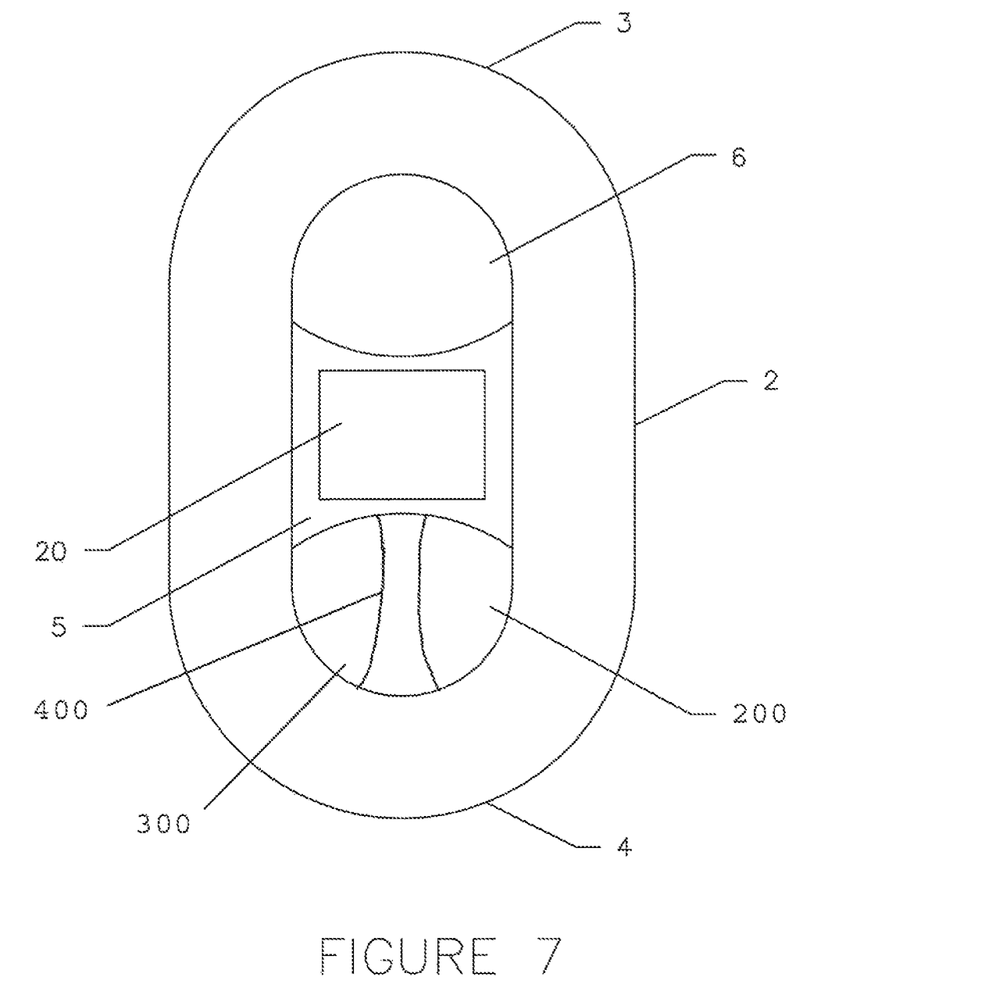
FIG. 7 is a front view of an alternative embodiment of an improved D-ring apparatus.

In one embodiment a connecting member 5 is attached to the first arm 1 and second arm 2, approximately mid-way between the first arcuate member 3 and the second arcuate member 4, thereby forming a first aperture 6 and a second aperture 7. The first aperture 6 and second aperture 7 are substantially similar in shape and size. Connecting member 5 has a front side and a back side. The front side and back side of the connecting member are substantially flat and connecting member 5 has a thickness which is smaller than the thickness of the arms and arcuate members. Connecting member 5 comprises two arcuate shaped sides and two linear sides. The linear sides are located at opposite ends of connecting member 5 and attached to the first arm 1 and second arm 2, respectively. The two arcuate shaped sides are located opposite each other so that they face the interior of the first arcuate member 3 and second arcuate member 4, respectively, thereby forming the first aperture 6 and second aperture 7. While connecting member 5 is shown as having a relatively narrow middle section, the section located approximately half-way between the first arm and the second arm in FIG. 1, the middle section of connecting member 5 may be wider. In one embodiment, the middle section of connecting member 5 is wide enough to place a label 20 on the middle section of the connecting member 5. In one embodiment, connecting member 5, does not have a label. In another embodiment, label 20 is located on connecting member 5. The label 20 may be of any size that fits on the connecting member 5. In one embodiment (not shown), label 20 does not occupies less than half of the exposed surface of one side of connecting member 5. In another embodiment, as shown in FIG. 7, label 20 occupies more than half the exposed surface of one side of connecting member 5. In yet another embodiment, label 20 is located on only one side of connecting member 5. In a further embodiment, there are two labels, one on each side of connecting member 5.

In one embodiment, the connecting member 5 is integrally formed with the first arm 1, the second arm 2, the first arcuate member 3, and the second arcuate member 4. In an alternate embodiment, the connecting member 5 is permanently attached to the first arm 1 and the second arm 2 through means well known in the art, such as welding.

In another embodiment, connecting member 5, has at least one extension 400 which extends from one of the arcuate shaped sides of connecting member 5. The extension 400 attaches to first arcuate member 3 such that there is one aperture on one side of connecting member 5 and two apertures 200 and 300 formed on the opposite side of connecting member 3. In yet another embodiment, connecting member 5 has two extensions, each extending from one of the arcuate shaped sides of connecting member 5. The first extension attaches to first arcuate member 3 and the second extension attaches to second arcuate member 4, such that there are four apertures formed in the D-ring apparatus, two apertures on each side of the connecting member.

In one embodiment, the connecting member 5 comprises an indicia (not shown) on label 20 indicating the date the D-ring apparatus was put into service. In another embodiment, the connecting member 5 comprises a label 20 which may include information regarding the manufacturer, the date of manufacturer, and/or an indicia of the date the D-ring apparatus was put into service.

Figure 4:
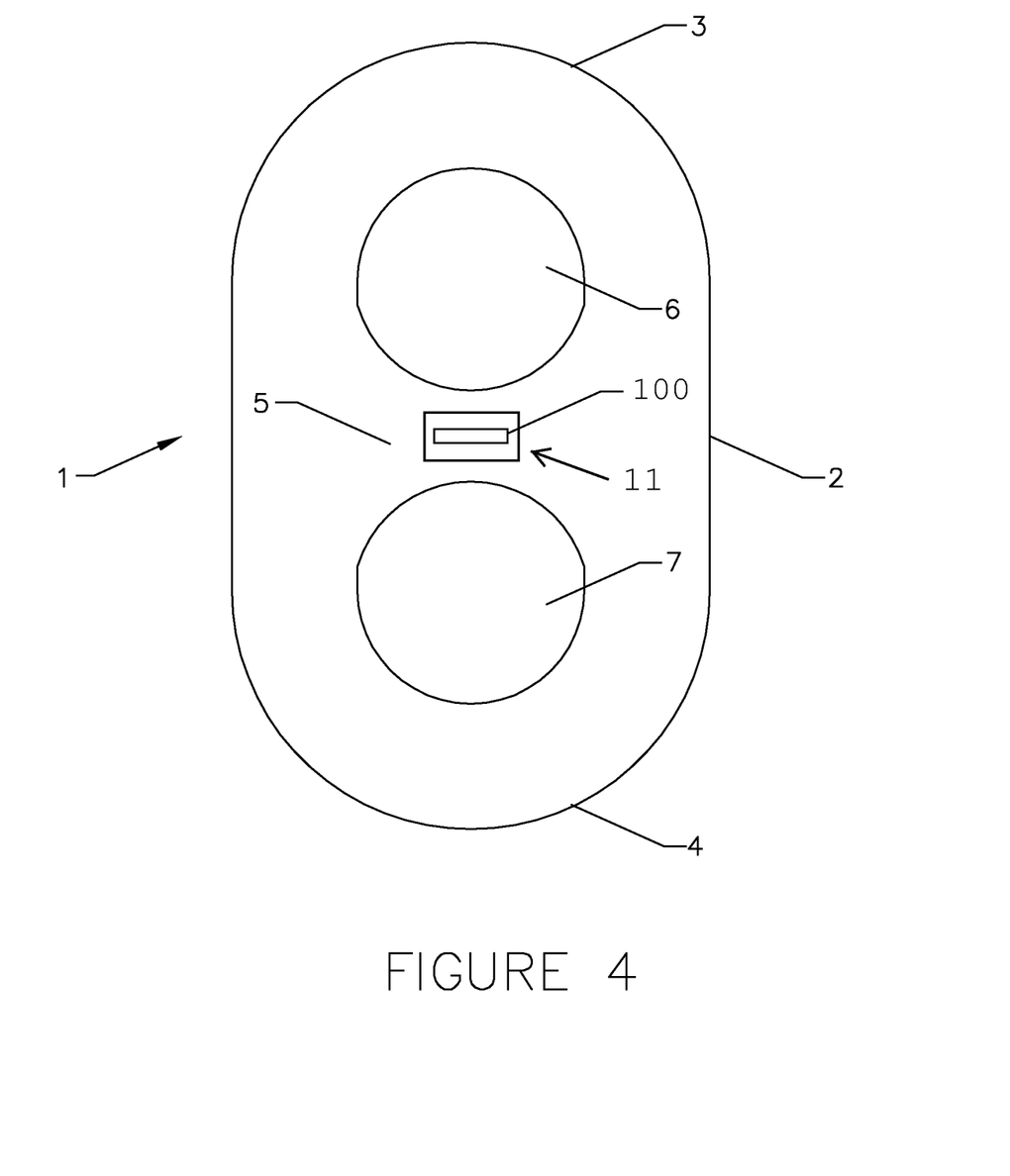
FIG. 4 is a front view of an improved D-ring apparatus with an RFID chip.

As shown in FIG. 4, in a further embodiment, the connecting member 5 comprises a recess 11 and a radio frequency identification (RFID) chip or tag 100 located within the recess. The RFID chip or tag 100 enables a user to monitor the conditions of the D-ring apparatus, including, but not limited to, the identity, location, and history of the operation and use of the D-ring apparatus. The RFID chip or tag 100 may be secured in the recess using an adhesive, resin, epoxy, or other material having desired properties. There are many other ways in which an RFID chip or tag 100 may be incorporated into the D-ring apparatus, including securing the RFID chip or tag 100 onto the connecting member 5 (when the connecting member 5 does not comprise a recess) with an adhesive, resin, epoxy, or other materials having desired properties.

Figure 5:
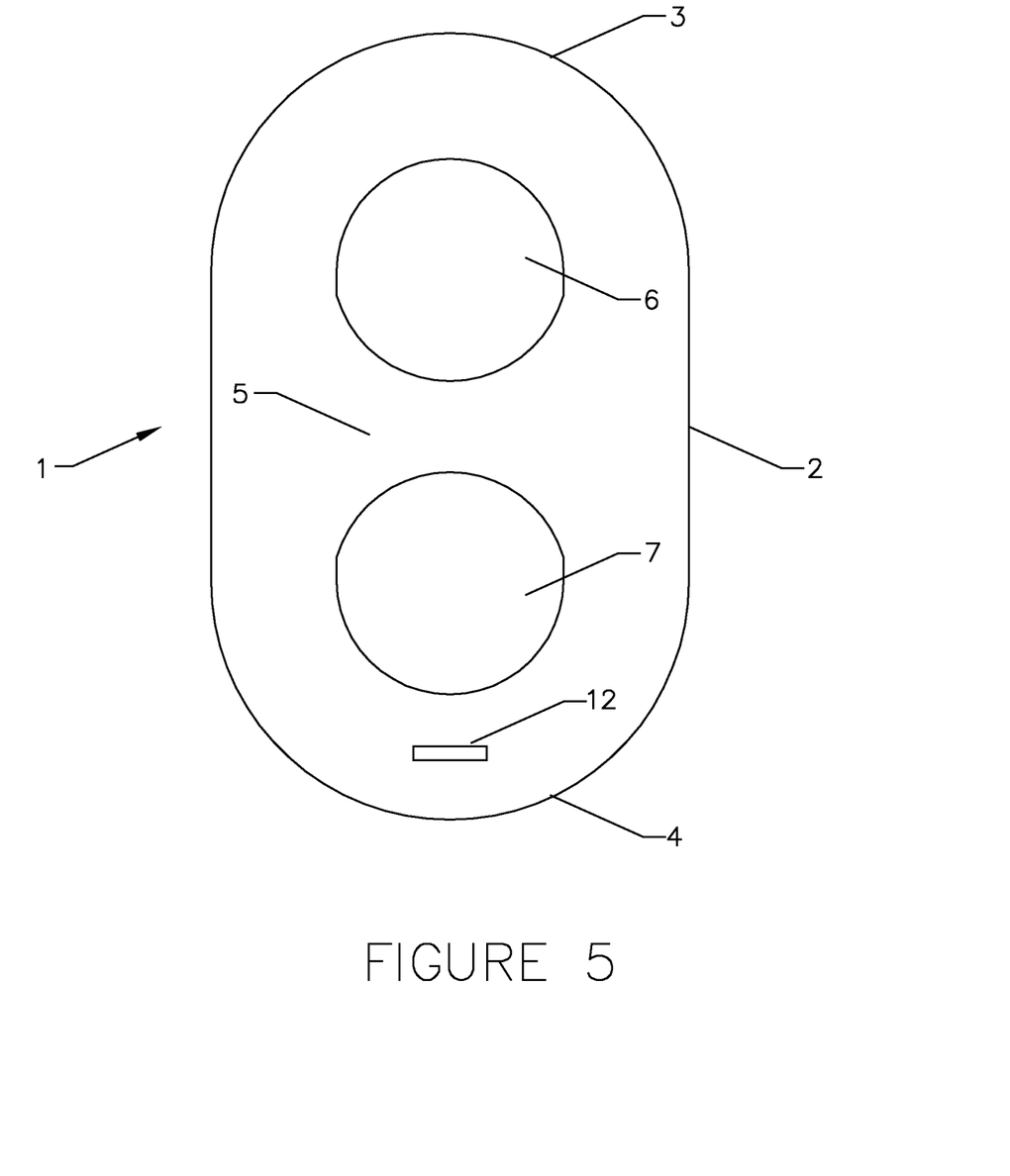
FIG. 5 is a front view of an improved D-ring apparatus with a wear indicator.

As shown in FIG. 5, in yet another embodiment, the improved D-ring apparatus further comprises a wear indicator 12. In one embodiment, the wear indicator 12 is a raised bar. The "bar" can be of any shape and size as long as it can be perceived by a user prior to the bar being in a worn condition. In another embodiment, as shown in FIG. 1, the wear indicator is a recessed area 30. The recessed area 30 may be of any shape or size, as long as it can be perceived by a user prior to the D-ring becoming overly worn. The wear indicator 12 or 30 is located on at least one of the arcuate members 3 and 4. Wear indicator 12 or 30 may be located in any location on the arcuate member. In one embodiment, the wear indicator is located substantially in the middle of the front side or back side of the arcuate member. In another embodiment, the wear indicator is located on both of the arcuate members 3 and 4. In this embodiment, the wear indicators may either both be raised bars, both be recessed areas, or one wear indicator on one arcuate member may be a raised bar and the wear indicator on the other arcuate member may be a recessed area. In use, a connecting means 9, described below, will be located on the arcuate members, 3 and 4, and over time, the arcuate members will wear through rubbing of the connecting means 9 on the arcuate members 3 and 4. When the wear indicator 12 is a raised bar, after sufficient use, the rubbing of the connecting means 9 on the arcuate member on which the wear indicator 12 is located results in the wear indicator 12 no longer being raised, instead it will be the same level as the surface of the D-ring. This indicates to a user that the D-ring is no longer safe to use. When the wear indicator 30 is a recessed area, after sufficient use, the rubbing of the connecting means 9 on the arcuate member on which the wear indicator 30 is located results in the portion of the arcuate member around the wear indicator 30 wearing down to the same level as the recessed area of the wear indicator 30 such that a difference between the wear indicator 30 and the arcuate member may no longer be perceived. This indicates to a user that the D-ring is no longer safe to use.

The improved D-ring apparatus may comprise any combination of indicia, wear indicators, and RFID chips. Therefore, in one embodiment, the D-ring apparatus comprises an RFID chip and date of use indicia on the connecting member 5, as well as wear indicators on one or both arcuate arms 3 and 4. In another embodiment, the D-ring apparatus comprises an RFID chip on the connecting member 5 and wear indicators on one or both arcuate arms 3 and 4. In a further embodiment, the D-ring apparatus comprises a date of use indicia and wear indicators on one or both arcuate arms 3 and 4. In another embodiment, the D-ring apparatus comprises an RFID chip and a date of use indicia on the connecting member 5.

Figure 6:
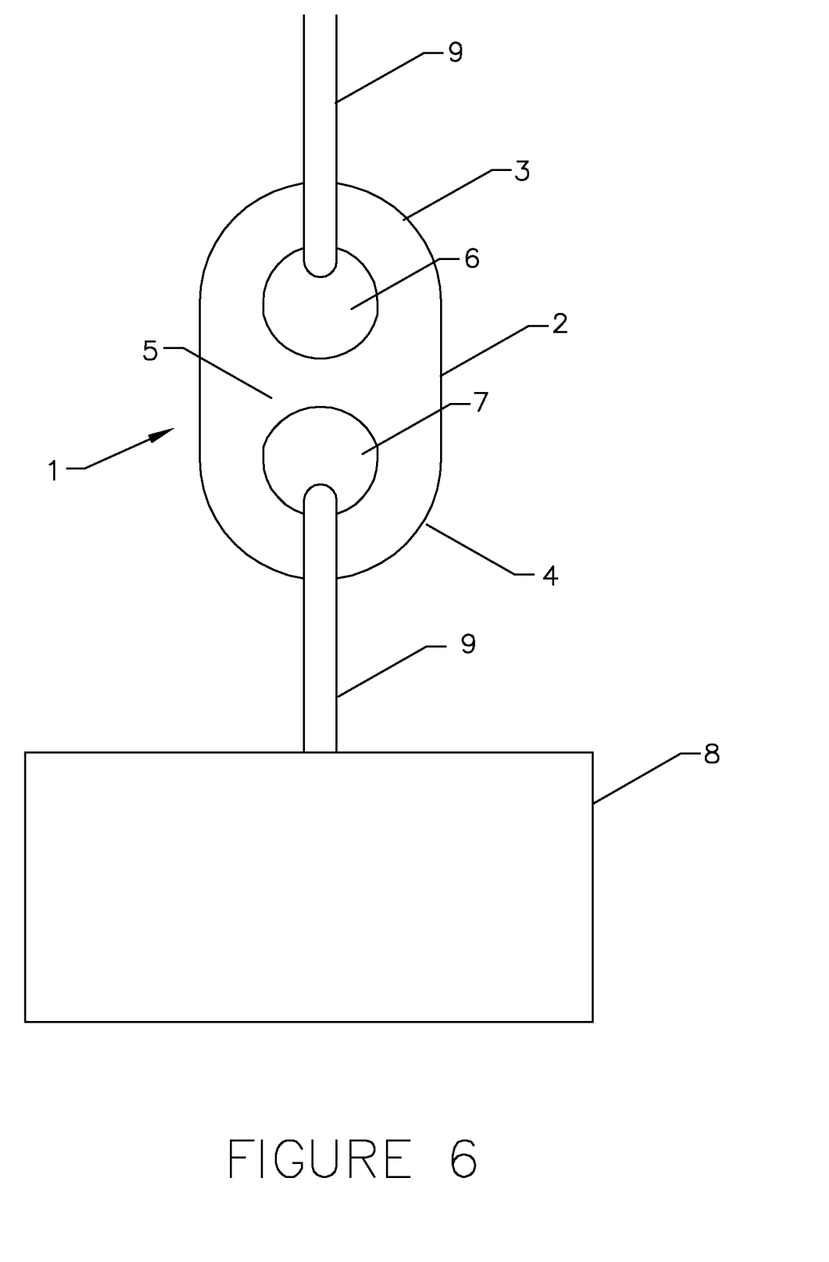
FIG. 6 is a view of an improved D-ring apparatus shown in use with connecting means.

The improved D-ring apparatus may be used in most industrial settings where items or objects will be hoisted or lifted, including off-shore, marine and oil-field applications, shipping applications, and the construction industry. With reference to FIG. 6, the object to be lifted 8 will be removably attached to the improved D-ring apparatus through one of the apertures via a connecting means 9, such as a rope, cable, sling, shackle, or other means known in the art 8. A second connecting means 9, such as a rope, cable, sling, or similar means is attached to a hoist, cable, wench, or other lifting arrangement and removably connected through the other aperture via a connecting means, such as a rope cable, sling, shackle, or other means known in the art, and used in lifting the object or item. The connecting member 5 separating the two apertures 6, 7 results in the apertures being located in a vertical arrangement when the lifting operation is performed; thereby the connecting means 9 will be located on the first arcuate member 3 and the second arcuate member 4, respectively, once the item or object is lifted into the air. Without the connecting member 5, the connecting means 9 could be located on the first arm 1 and the second arm 2. When the connecting means 9 are located on the arms during lifting, the weight of the object 8 being lifted could result in a sudden slipping of the connecting means 9 from the arms to the arcuate members 3, 4, which could result in the failure of the connecting means 9 (the rope, cable, sling, shackle, or other means could break) and thereby damage the object 8 being lifted and/or cause injury to property or persons under the object 8.

For the purpose of understanding the improved D-ring apparatus, references are made in the text to exemplary embodiments of an improved D-ring apparatus, only some of which are described herein. It should be understood that no limitations on the scope of the disclosure are intended by describing these exemplary embodiments and that other combinations of elements described herein are meant to be included within the scope of the disclosure. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a Furthermore, the described features, structures, or characteristics may be combined in any suitable manner in one or more embodiments. One skilled in the relevant art will recognize that the D-ring apparatus may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrases "in one embodiment," "in an embodiment," and similar language throughout this specification may, but do not necessarily, all refer to the same embodiment.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change to the basic function to which it is related.

The invention claimed is:

1. A hoist ring apparatus comprising:
   a. a first arm and a second arm, wherein said first arm is substantially parallel to said second arm,
   b. a first arcuate member and a second arcuate member, wherein said first arcuate member is attached to said first arm and said second arm and wherein said second arcuate member is attached to said first arm and said second arm opposite of said first arcuate member, and
   c. a connecting member attached to said first arm and said second arm and said connecting member being located approximately midway between said first and second arcuate members,
wherein said connecting member comprises an RFID chip and a wear indicator is located on said first arcuate member or said second arcuate member.

2. The hoist ring apparatus of claim 1, wherein said connecting member comprises an indicia indicating the date the hoist ring was put into service.

3. The hoist ring apparatus of claim 1, wherein said wear indicator comprises a raised bar.

4. The hoist ring apparatus of claim 1, wherein said wear indicator comprises a recess in said first arcuate member or said second arcuate member.

5. The hoist ring of claim 1, wherein said connecting member further comprises a first extension, said first extension being attached to said connecting member and to said first arcuate member.

6. A hoist ring apparatus comprising:
   a. a first arm and a second arm, wherein said first arm is substantially parallel to said second arm,
   b. a first arcuate member and a second arcuate member, wherein said first arcuate member is attached Co said first arm and said second arm and wherein said second arcuate member is attached to said first arm and said second arm opposite of said first arcuate member,
   c. a connecting member attached to said first arm and said second arm, said connecting member comprising an RFID chip, and said connecting member being located mid-way between said first and second arcuate members, and
   d. a first aperture and a second aperture, wherein said first arm, said second arm, said first arcuate member, and said second arcuate member are integrally formed and wherein a wear indicator is located on said first arcuate member or said second arcuate member.

7. The hoist ring apparatus of claim 6, wherein said connecting member comprises an indicia indicating the date the hoist ring was put into service.

8. The hoist ring apparatus of claim 6, wherein said wear indicator comprises a raised bar.

9. The hoist ring apparatus of claim 6, wherein said wear indicator comprises a recess in said first arcuate member or said second arcuate member.

10. A hoist ring apparatus comprising:
    a. a first arm and a second arm, wherein said first arm is substantially parallel to said second arm,
    b. as first arcuate member and as second arcuate member, wherein said first arcuate member is attached to said first arm and said second arm and wherein said second arcuate member is attached to said first arm and said second arm opposite of said first arcuate member,
    c. a connecting member attached to said first arm, said connecting member comprising an RFID chip, and said second arm and said connecting member being located mid-way between said first and second arcuate members, and
    d. a first aperture and a second aperture, wherein said first arm, said second arm, said first arcuate member, and said second arcuate member are integrally formed together and said connecting member is permanently attached to said first arm and said second arm and wherein a wear indicator is located on said first arcuate member or said second arcuate member.

11. The hoist ring apparatus of claim 10, wherein said connecting member comprises an indicia indicating the date the hoist ring was put into service.

12. The hoist ring apparatus of claim 10, wherein said wear indicator comprises a raised bar.

13. The hoist ring apparatus of claim 10, wherein said wear indicator comprise a recess in said first arcuate member or said second arcuate member.

14. The hoist ring of claim 10, wherein said connecting member further comprises a first extension, said first extension being attached to said connecting member and to said first arcuate member, and said hoist ring apparatus comprises at least three apertures.

15. A hoist ring apparatus comprising:
    a. first arm and a second arm, wherein said first arm is substantially parallel to said second arm,
    b. as first arcuate meinber and a second arcuate member, wherein said first arcuate member is attached to said first arm and said second arm and wherein said second arcuate member is attached to said first arm and said second arm opposite of said first arcuate member, and
    c. a connecting member attached to said first arm and said second arm and said connecting member being, located approximately midway between said first and second arcuate members, wherein said connecting member comprises an RFID chip and wherein a wear indicator is located on said first arcuate member or said second arcuate member, said wear indicator indicating the wear on said hoist ring apparatus.

* * * * *